US006755532B1

(12) United States Patent
Cobb (10) Patent No.: US 6,755,532 B1
(45) Date of Patent: Jun. 29, 2004

(54) METHOD AND APPARATUS FOR MONOCENTRIC PROJECTION OF AN IMAGE

(75) Inventor: Joshua M. Cobb, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/393,236

(22) Filed: Mar. 20, 2003

(51) Int. Cl.[7] ...................... G03B 21/00; G02B 27/22; G02B 27/24
(52) U.S. Cl. .................. 353/7; 353/10; 359/471; 359/479
(58) Field of Search ............... 353/7, 10, 30; 359/462, 466, 471, 478–479, 629, 631, 649, 727

(56) References Cited

U.S. PATENT DOCUMENTS 3,455,223 A * 7/1969 Spoelhof ................ 396/21
3,598,482 A * 8/1971 Miller ................... 353/98
4,854,688 A * 8/1989 Hayford et al. ........... 359/433
6,416,181 B1 * 7/2002 Kessler et al. ............ 353/7
6,511,182 B1 * 1/2003 Agostinelli et al. ........ 353/7
6,522,474 B2 * 2/2003 Cobb et al. ............. 359/631
6,550,918 B1 * 4/2003 Agostinelli et al. ........ 353/7

OTHER PUBLICATIONS

Warren J. Smith; Modern Optical Engineering, the Design of Optical Systems; pp. 212–213.

* cited by examiner

*Primary Examiner*—Christopher Mahoney
(74) *Attorney, Agent, or Firm*—Nelson Adrian Blish (57) ABSTRACT

A monocentric image generation system (100) for forming a curved image (110) using a spherical mirror (92), a beamsplitter (102) and a ball lens assembly (30) and, optionally, a field lens (112). An image source (94) provides a source image through an aperture stop location (96) at the center of curvature $C_s$ of the spherical mirror (92). The beamsplitter (102) provides the resulting intermediate image (90) so that it is concentric with the ball lens assembly (30) in order to form the curved image (110).

53 Claims, 9 Drawing Sheets

PRIOR ART

PRIOR ART

METHOD AND APPARATUS FOR MONOCENTRIC PROJECTION OF AN IMAGE

FIELD OF THE INVENTION

This invention generally relates to projection apparatus and more particularly relates to an apparatus and method for forming a curved image from a substantially flat image source using a monocentric optical system.

BACKGROUND OF THE INVENTION

In conventional projection apparatus, an image, provided from an essentially flat image-forming surface, is projected onto an essentially flat display surface. In film-based projection, for example, light is transmitted through a flat piece of film for projection onto a flat movie screen. Digital image-forming devices, such as transmissive and reflective Liquid Crystal Displays (LCDs) and Digital Micromirror Devices (DMDs) similarly produce an image on a flat surface. This allows projection apparatus employing these devices to use output optics that are similar to the projection optics employed in film-based projectors.

A number of optical systems, however, form images using curved surfaces, particularly optical systems of the immersive type that are designed to provide a wide field of view. One example system of this type is disclosed in commonly assigned U.S. Pat. No. 6,416,181 (Kessler et al.), incorporated herein by reference, herein referred to as the '181 patent. In the '181 disclosure, a curved mirror is employed, in combination with an imaging source, a diffusive surface, a ball lens, and beamsplitter, for providing a virtual image. The monocentric optical apparatus of the '181 disclosure provides autostereoscopic imaging with large viewing pupils, a very wide field of view, and minimal aberration. In order to provide this type of imaging and take advantage of the inherent benefits of monocentric projection, the apparatus of the '181 disclosure, given its source image formed on a flat surface must form an intermediate image having a suitable curvature.

Figure 1:
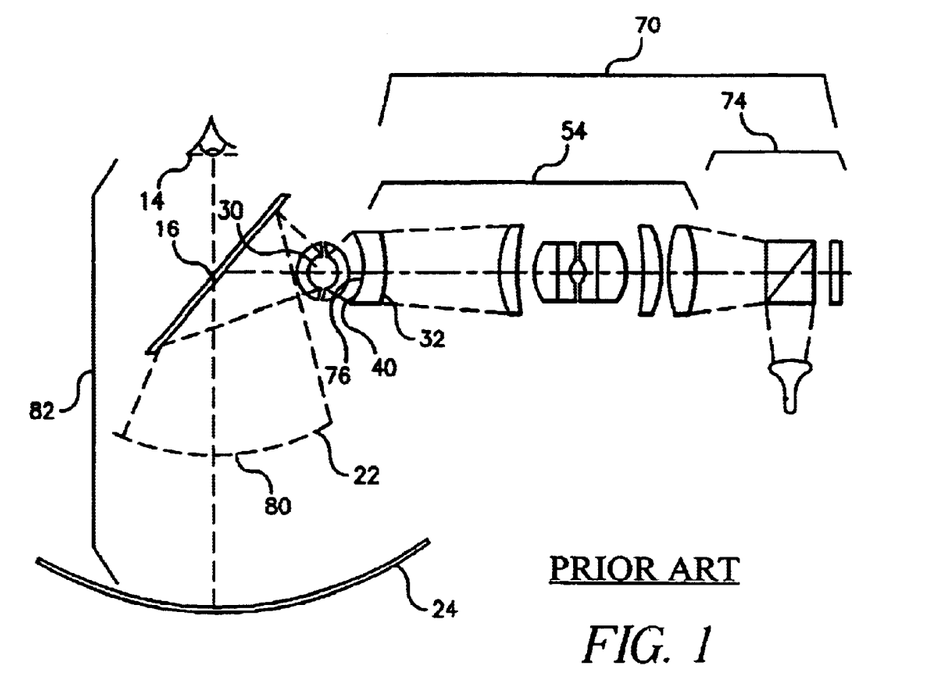
FIG. 1 is a schematic diagram showing a prior art arrangement of optical components for providing a curved image formed on a diffusive element and projected using a ball lens.

Referring to FIG. 1, there is shown, extracted from the more detailed description of the '181 disclosure, a portion of an image generation system 70 for providing an intermediate curved image 80 for projection in a stereoscopic projection system 82. Here, an image generator 74 provides a source image from a flat surface, such as from a reflective LCD. A relay lens 54 directs light from image generator 74 onto a diffusing element 32, so that a curved intermediate image 76 is formed on a diffusive surface 40. A ball lens assembly 30, cooperating with a beamsplitter 16, projects curved intermediate image 76 toward a front focal surface 22 of a curved mirror 24 to form intermediate curved image 80. Curved mirror 24 then provides a virtual image of intermediate curved image 80 for an observer 14.

As the '181 disclosure points out, forming an intermediate image on a diffusive surface helps to overcome limitations imposed by the LaGrange invariant. A product of the size of the emissive device and the numerical aperture, the LaGrange invariant determines output brightness and is an important consideration for matching the output of one optical system with the input of another. Use of the diffuser with the '181 apparatus is necessary because the image-forming device, typically a reflective LCD or other spatial light modulator, is a relatively small emissive device, measuring typically no more than about 1 inch square. Referring again to FIG. 1 and to the '181 disclosure, in order to maximize the light output from image generator 74, it is necessary to provide a large angle of emitted light, using diffusing element 32, in order to adequately fill the pupil of the projection optical system (downstream from image generator 74 in the '181 apparatus). Diffusive surface 40 is shaped to provide curved intermediate image 76 with the desired curvature for the projection optical system.

While use of a diffusive element provides a workable solution for forming a curved image, there are some drawbacks to using a diffusive component. In scattering light, diffusive optical elements necessarily cause some loss of brightness. Diffusive surfaces tend to increase graininess in an image and reduce contrast. Thus, while use of diffusive surfaces helps to surmount LaGrange invariant limitations, there is a need for a solution that provides an intermediate curved image and allows increased levels of brightness and high contrast. Brightness, expressed in units of nits or candelas/$m^2$, is particularly important for providing displays that are readable under daylight conditions. As a rule of thumb, bright displays provide a luminance of about 250 nits or higher. Notebook LCDs, for example, typically provide luminance in the range of about 70 nits, unsuitable for most outdoor viewing. Automated Teller Machines (ATMs) typically provide luminance in the range of about 600 nits. Avionics displays provide from 900 to 1200 nits. For immersive imaging and simulation applications in particular, it is desirable to be able to provide a curved image having high brightness.

Thus, it can be seen that there is a need for a low-cost imaging subsystem that provides, from a substantially flat image source, a curved image having high brightness as an intermediate image for projection and display apparatus.

SUMMARY OF THE INVENTION

It is an object of the present invention to provide an apparatus and method for forming a curved image from a substantially flat image source. With this object in mind, the present invention provides an apparatus for forming a curved image comprising:

(a) a spherical mirror having a mirror center of curvature;
(b) a beamsplitter disposed between the vertex of the spherical mirror and the mirror center of curvature;
(c) an image source for providing image-bearing light to the spherical mirror;
   the spherical mirror cooperating with the beamsplitter to form an intermediate image of the image source, the intermediate image having an image center of curvature; and
(d) a ball lens segment, centered at the image center of curvature, for forming the curved image from the intermediate image.

It is a feature of the present invention that it provides a curved image using a straightforward optical system, using relatively inexpensive reflective, beamsplitting, and projection optics.

It is an advantage of the present invention that it provides an optical system for forming a curved image that can be packaged in a compact fashion, allowing its use its use in desktop and other small-scale imaging applications.

It is a further advantage of the present invention that it allows the use of image source components having a large area, thereby allowing increased image brightness, even exceeding minimum brightness levels proposed for daylight displays.

It is a further advantage of the present invention that it forms a curved image without the need for a diffusive surface, thereby allowing the curved image to have higher contrast and minimizing graininess.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 2:
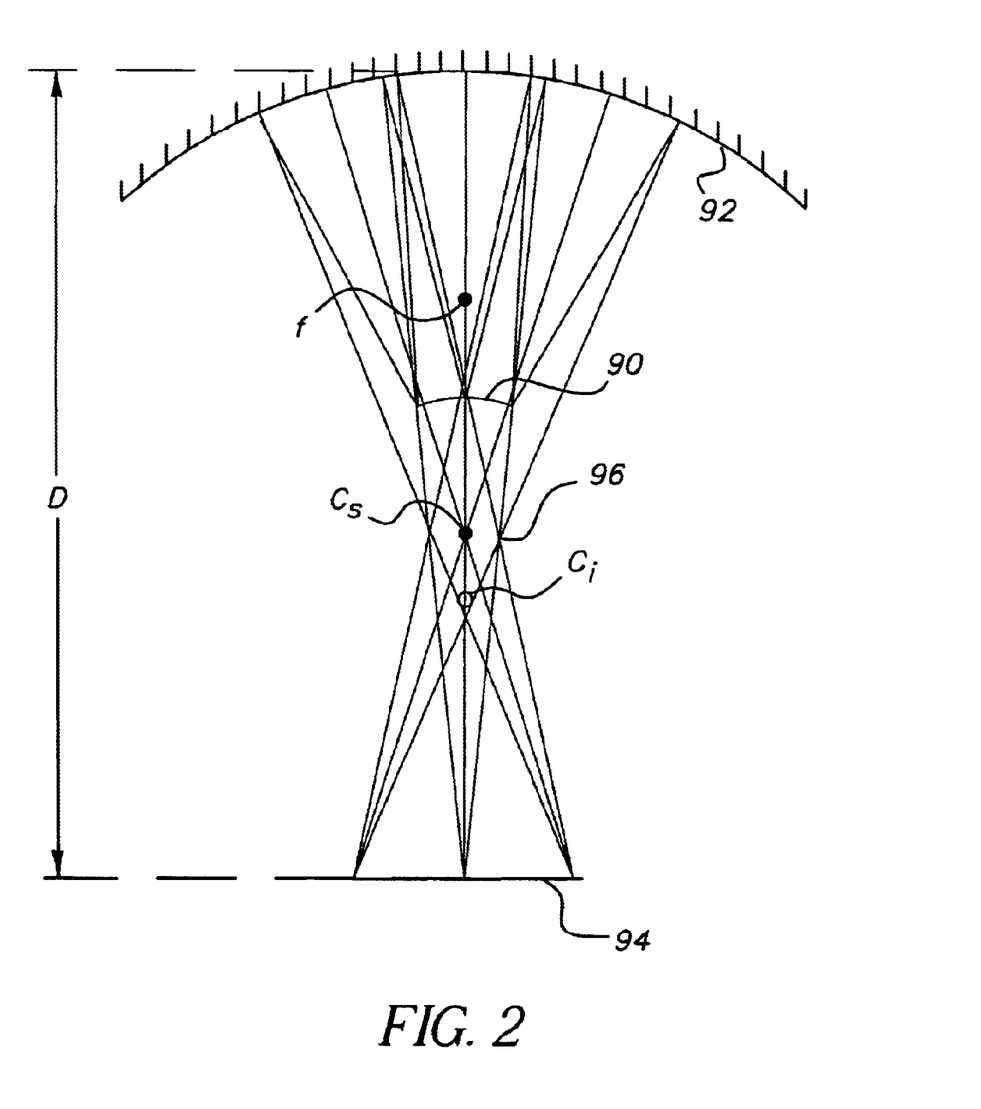
FIG. 2 is a schematic diagram showing how an intermediate image is formed in the apparatus of the present invention.

Referring to FIG. 2, there is shown how an intermediate image 90 is formed by a spherical mirror 92 according to the present invention. Image-bearing light from image source 94 is directed toward spherical mirror 92 through an aperture stop location 96 which defines the angle of light from image source 94 that is available for forming intermediate image 90. Aperture stop location 96 is at the center of curvature $C_s$ of spherical mirror 92. As is represented in FIG. 2, with aperture stop location 96 centered at mirror center of curvature $C_s$, the central rays that pass through $C_s$ are reflected back toward this same point. As the traced light rays of FIG. 2 show, caved intermediate image 90 is typically formed between mirror center of curvature $C_s$ and the mirror focal point f. Curved intermediate image 90 has an image center of curvature $C_i$ that is in a different location from mirror center of curvature $C_s$. As the distance D between image source 94 and spherical mirror 92 increases, the respective centers of curvature $C_i$ and $C_s$ move toward each other, coinciding as distance D approaches infinity. At this idealized infinite distance D between image source 94 and spherical mirror 92, curved intermediate image 90 would lie on focal point f.

Using the overall arrangement of FIG. 2, image source 94 can be any of a number of image sources that emit light, such as a display LCD, a CRT, or an OLED or PLED device, for example. Two characteristics of image source 94 are particularly significant with this arrangement:

(i) The image formed on image source 94 is substantially flat. There may be some slight curvature to this image, such as would be provided by a CRT; however, the arrangement of FIG. 2 works well when image source 94 is flat and shows how intermediate image 90 is formed having a curvature using the methods of the present invention. Since most image display devices form a flat image, there is, then, no need for modification to off-the-shelf display components with this arrangement.

(ii) Image source 94 can be several inches in diameter. This is unlike other apparatus for forming a curved intermediate image, such as was shown with reference to FIG. 1, for which a microdisplay, such as an LCD or DMD component is used. Use of a larger display device for image source 94 has particular advantages for increasing both image resolution and brightness.

As described with reference to the LaGrange invariant in the background section above, brightness in an optical system is a product of the emissive area and the solid angle. By allowing image source 94 to have a large emissive area, the method of the present invention provides considerable brightness levels while allowing light angles to be relatively small. Small angles are advantageous for maximizing image contrast and minimizing color shifting and other related image aberrations.

Ideal Ball Lens Operation

Figure 3A:
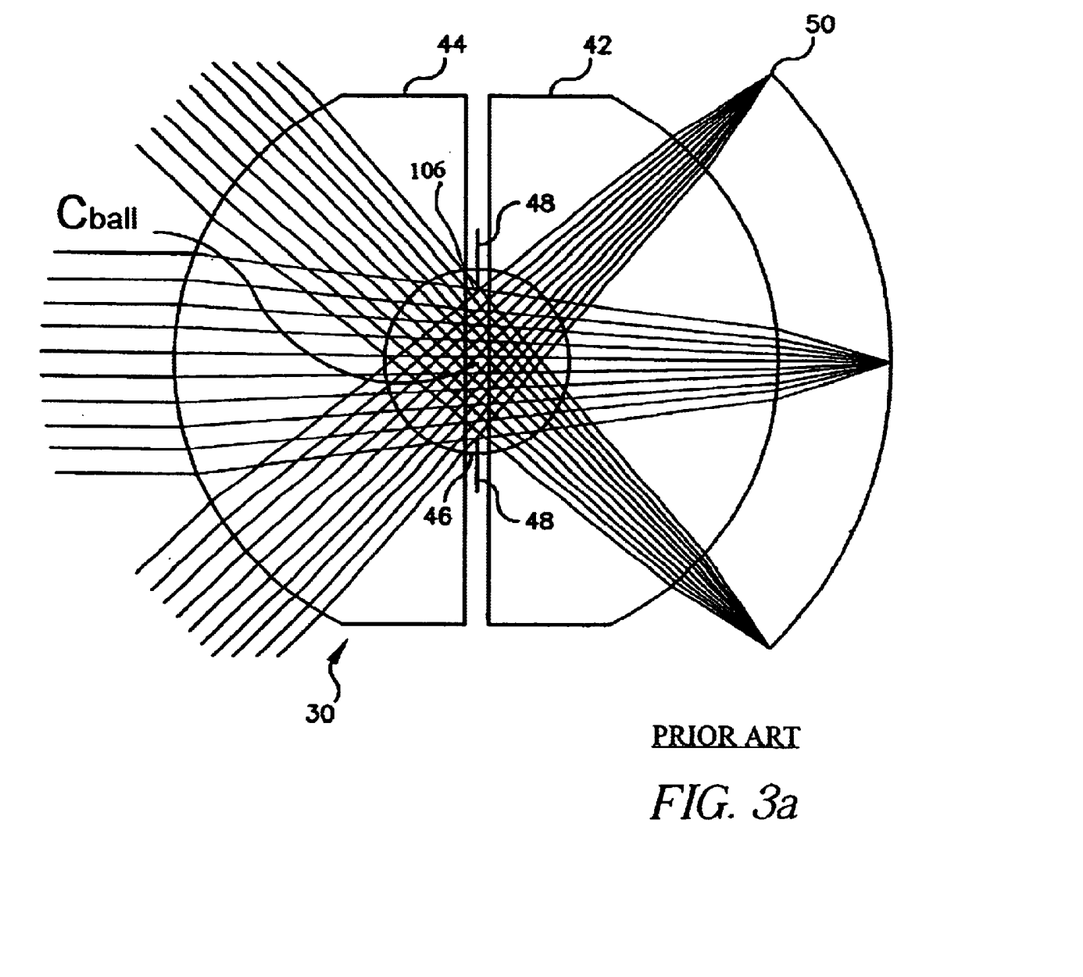
FIG. 3a is a schematic diagram showing optical behavior of a ball lens.

Referring to FIG. 3a, there is shown the concentric arrangement and optical characteristics of a ball lens assembly 30 for directing light from a curved image 50. A central spherical lens 46 is disposed between meniscus lenses 42 and 44. Spherical lens 46 and meniscus lenses 42 and 44 have indices of refraction and dispersion characteristics intended to minimize on-axis spherical and chromatic aberration, as is well known in the optical design arts. An aperture stop 48 defines a pupil 106 within ball lens assembly 30. Aperture Stop 48 need not be a physical stop, but may alternately be implemented using optical effects such as total internal reflection. In terms of the optics path, aperture stop 48 serves to define an entrance pupil and an exit pupil for ball lens assembly 30.

In a preferred embodiment, meniscus lenses 42 and 44 are selected to reduce image aberration and to optimize image quality for the projected image projected. It must be noted that ball lens assembly 30 could comprise any number of arrangements of support lenses surrounding central spherical lens 46. Surfaces of these support lenses, however many are employed, would share a common center of curvature with $C_{ball}$ the center of curvature of central spherical lens 46. Moreover, the refractive materials used for lens components of ball lens assembly could be varied, within the scope of the present invention. For example, in addition to standard glass lenses, central spherical lens 46 could comprise a plastic, an oil or other liquid substance, or any other refractive material chosen for the requirements of the application. Meniscus lenses 42 and 44, and any other additional support lenses in ball lens assembly 30, could be made of glass, plastic, enclosed liquids, or other suitable refractive materials, all within the scope of the present invention. In its simplest embodiment, ball lens assembly 30 could simply comprise a single central spherical lens 46, without additional supporting refractive components.

In ideal operation, curved image 50 shares the same center of curvature $C_{ball}$ as ball lens assembly 30. When arranged in this fashion, light from any point on curved image 50 is imaged with minimal aberration, as is represented in FIG. 3a.

Figure 3B:
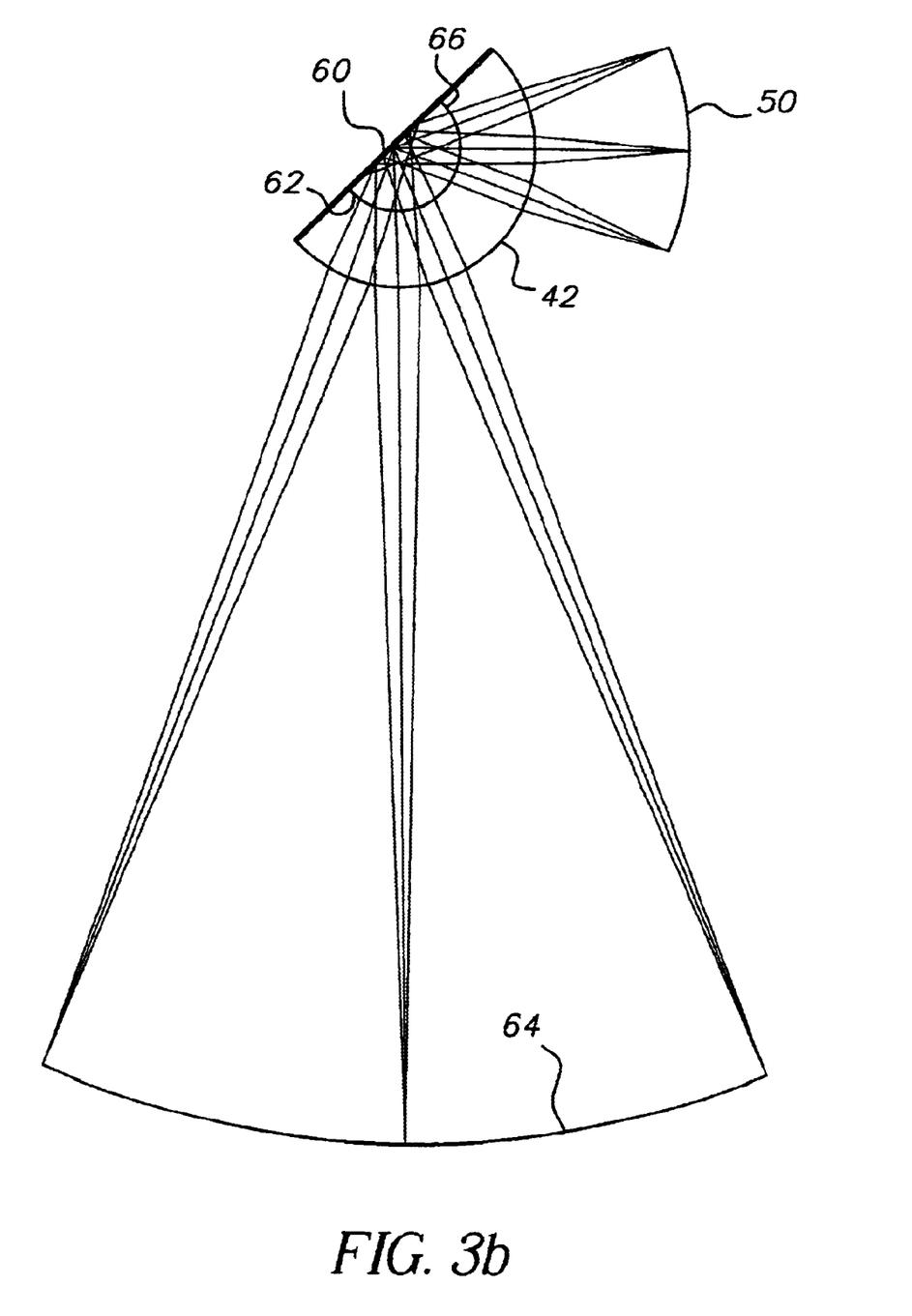
FIG. 3b is a schematic diagram showing optical behavior of an hemispheric lens with a reflective surface.

The inherent advantages of a ball lens can be exploited using a modified design, such as using an hemisphere combined with a folding mirror, as is shown in the cross-sectional ray diagram of FIG. 3b. In FIG. 3b, a hemispheric lens assembly 60 comprises a hemispheric central lens 66, one or more optional meniscus lenses 42, and a reflective surface 62 along the meridional plane of the hemisphere. Reflective surface 62 may be formed over the full surface of the meridional plane or may be formed only along a portion of this surface. As shown in FIG. 3b, hemispheric lens assembly 60 forms, from curved image 50 as its object, a curved image 64, folding the optical path at the same time. This arrangement can have advantages, for example, where space for optical components is constrained.

First Embodiment

Figure 4:
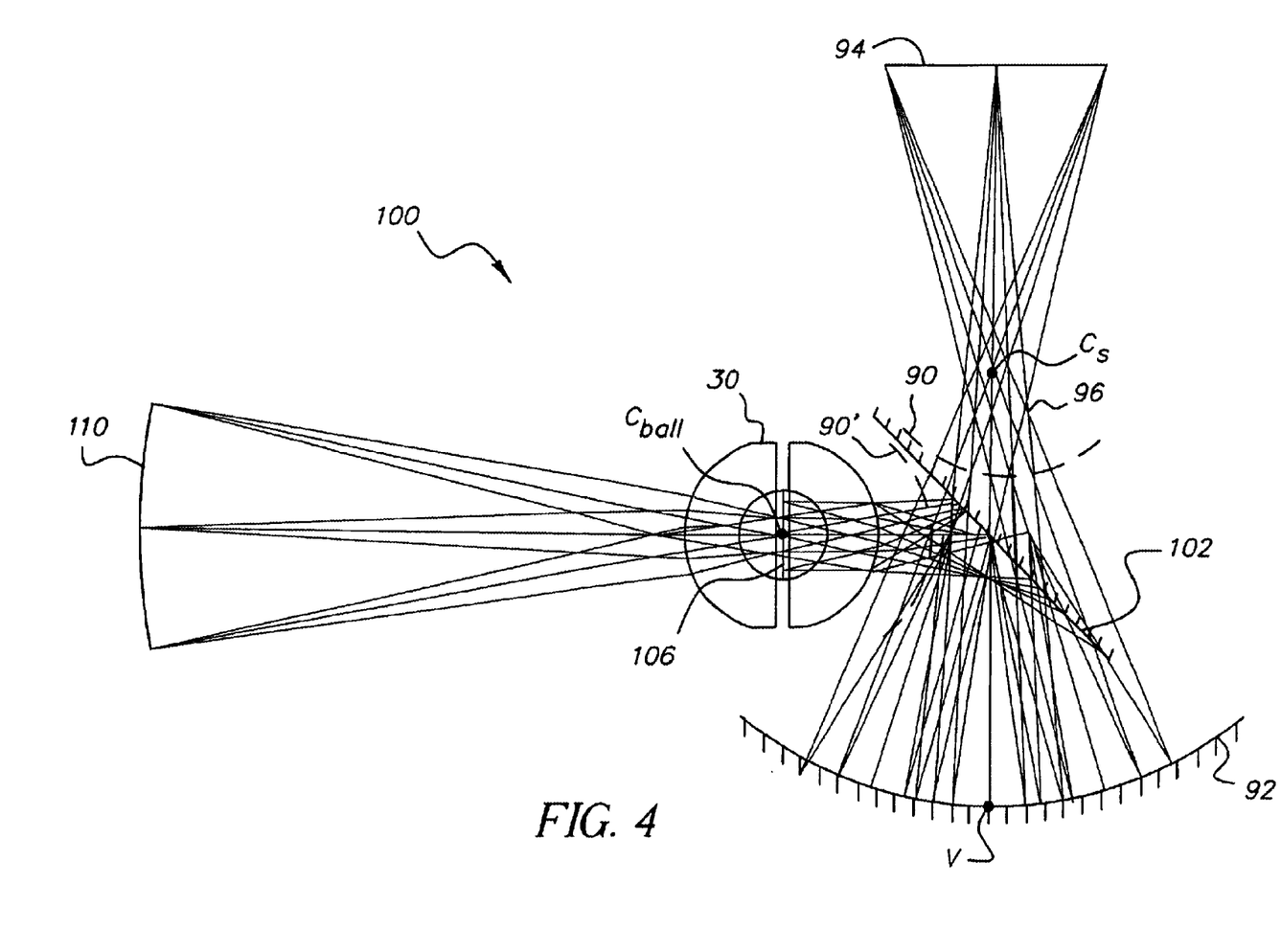
FIG. 4 is a schematic diagram showing a first embodiment of the present invention.

Referring to FIG. 4, there is shown a first embodiment of an image generation system 100 for forming a curved image 110 for projection or other display purposes according to the present invention. As was described with reference to FIG. 2, image source 94 provides image-bearing light to spherical mirror 92 through aperture stop location 96. Referring now to FIG. 4, a beamsplitter 102 is used to direct an intermediate image 90' so that it can be concentric to ball lens assembly 30. Because the light is being directed by spherical mirror 92 toward its center of curvature $C_s$, rather than towards the center of curvature $C_{ball}$ of ball lens assembly 30, some portion of the light does not enter the pupil 106 of ball lens assembly 30, thus causing vignetting. Overfilling pupil 106 of ball lens assembly 30 compensates for vignetting. Ball lens assembly 30 re-images intermediate curved intermediate image 90' to form curved image 110. Beamsplitter 102 is disposed between the vertex V of spherical mirror 92 and its center of curvature $C_s$ as shown in FIG. 4.

Second Embodiment

Figure 5:
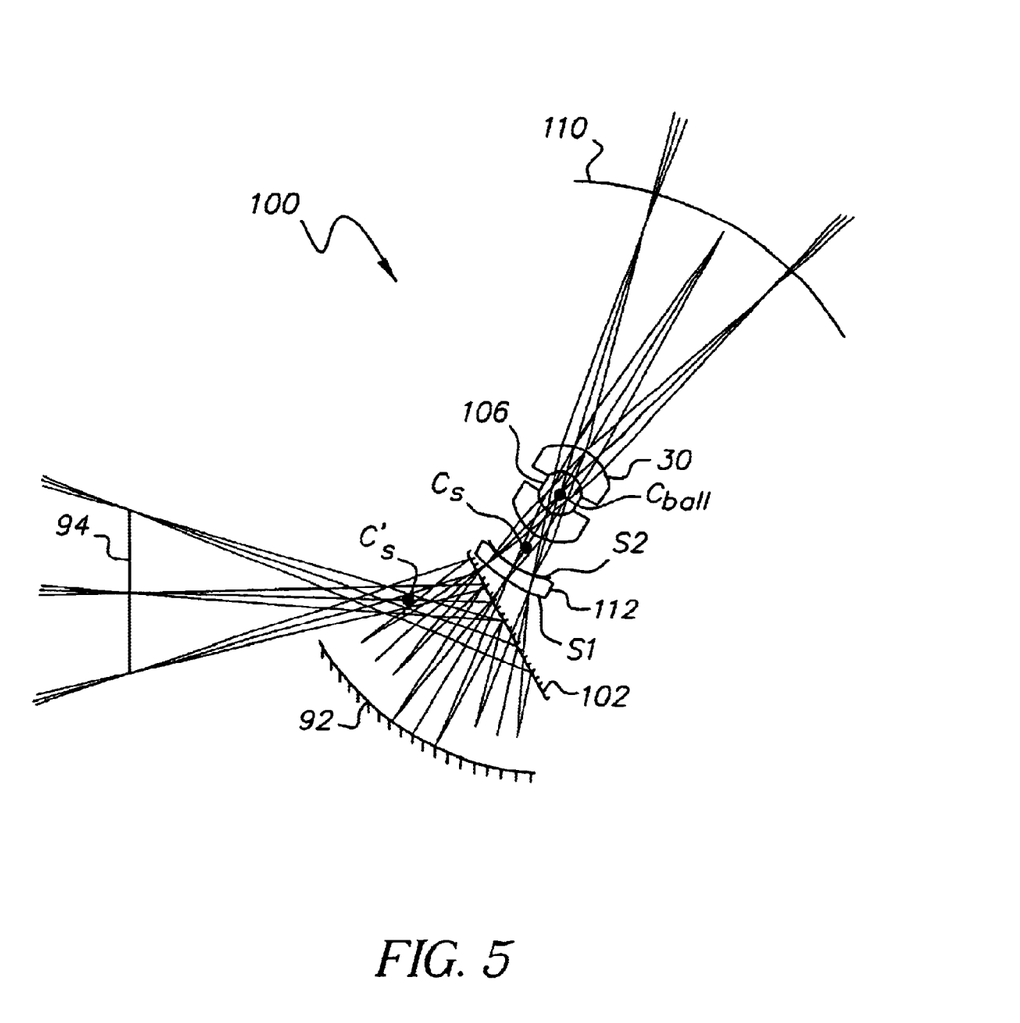
FIG. 5 is a schematic diagram showing an alternate embodiment of the present invention for forming a curved image, using a field lens.

Referring to FIG. 5, there is shown an improved embodiment of image generation system 100 in which a field lens 112 is positioned along the output axis where intermediate image 90 is formed. By positioning field lens 112 at this location, intermediate image 90 is not substantially changed; however, light from intermediate image 90 is directed toward center of curvature $C_{ball}$ of ball lens assembly 30. Once again, it is significant to observe that ball lens assembly 30 shares the same center of curvature $C_{ball}$ as intermediate image 90, but that this is not identical to the center of curvature $C_s$ of spherical mirror 92 or to the imaged center of curvature $C_s'$, towards which light from spherical mirror 92 is directed. The function of field lens 112 is, then, to image $C_s$ onto $C_{ball}$ without substantially affecting the image quality of intermediate image 90. By doing this, field lens 112 essentially redirects light in order to fill pupil 106 of ball lens assembly 30 without vignetting. Common to telescopic, microscopic, and similar "tube" optical systems, field lenses are widely employed in the optical arts, placed at the image location of a first lens, where the image formed at that image location becomes the object of a second lens. In this way, the field lens improves the overall brightness and field of view of the optical system. Background information on field lens and theory can be found, for example, in *Modern Optical Engineering, the Design of Optical Systems*, by Warren J. Smith, McGraw-Hill, N.Y., pp. 212–213 and in other textbooks known in the optics field.

In one embodiment, surface S1 of field lens 112 is concentric with mirror center of curvature $C_s$ and therefore does not deviate chief rays towards $C_{ball}$. In such an embodiment, surface S2, not concentric with mirror center of curvature $C_s$, operates to bend chief rays toward $C_{ball}$. Alternately, surface S2 could be concentric with mirror center of curvature $C_s$, surface S1 performing the operation of bending chief rays toward $C_{ball}$. Embodiments with either surface S1 or S2 concentric with $C_s$ or $C_{ball}$ represent the most straightforward approaches to the design of field lens 112; other designs could have neither surface S1 nor S2 concentric with mirror center of curvature $C_s$ or $C_{ball}$, however, these designs could be more complex.

Figure 6:
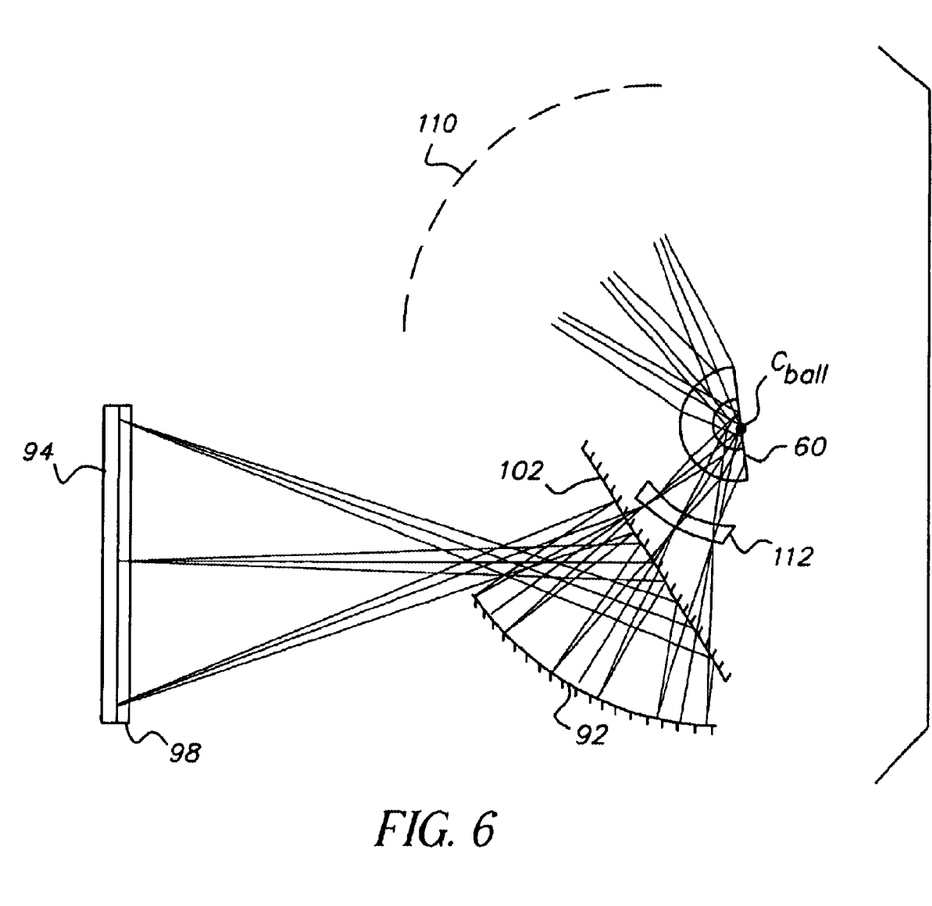
FIG. 6 is a schematic diagram showing an alternate embodiment of the present invention for forming a curved image using a hemispheric lens in combination with a field lens.

As was noted above with reference to FIG. 3b, the use of hemispheric ball lens assembly 60 may have advantages for simplifying the optical path Referring to FIG. 6, there is shown an alternative arrangement to that of FIG. 5, using hemispheric ball lens assembly 60 with field lens 112. In the arrangement of FIG. 6, field lens 112 again operates to image $C_s$ onto $C_{ball}$, where $C_{ball}$ is optically the center of curvature of hemispheric ball lens assembly 60.

Providing Advantages of Telecentric Light

Figure 7:
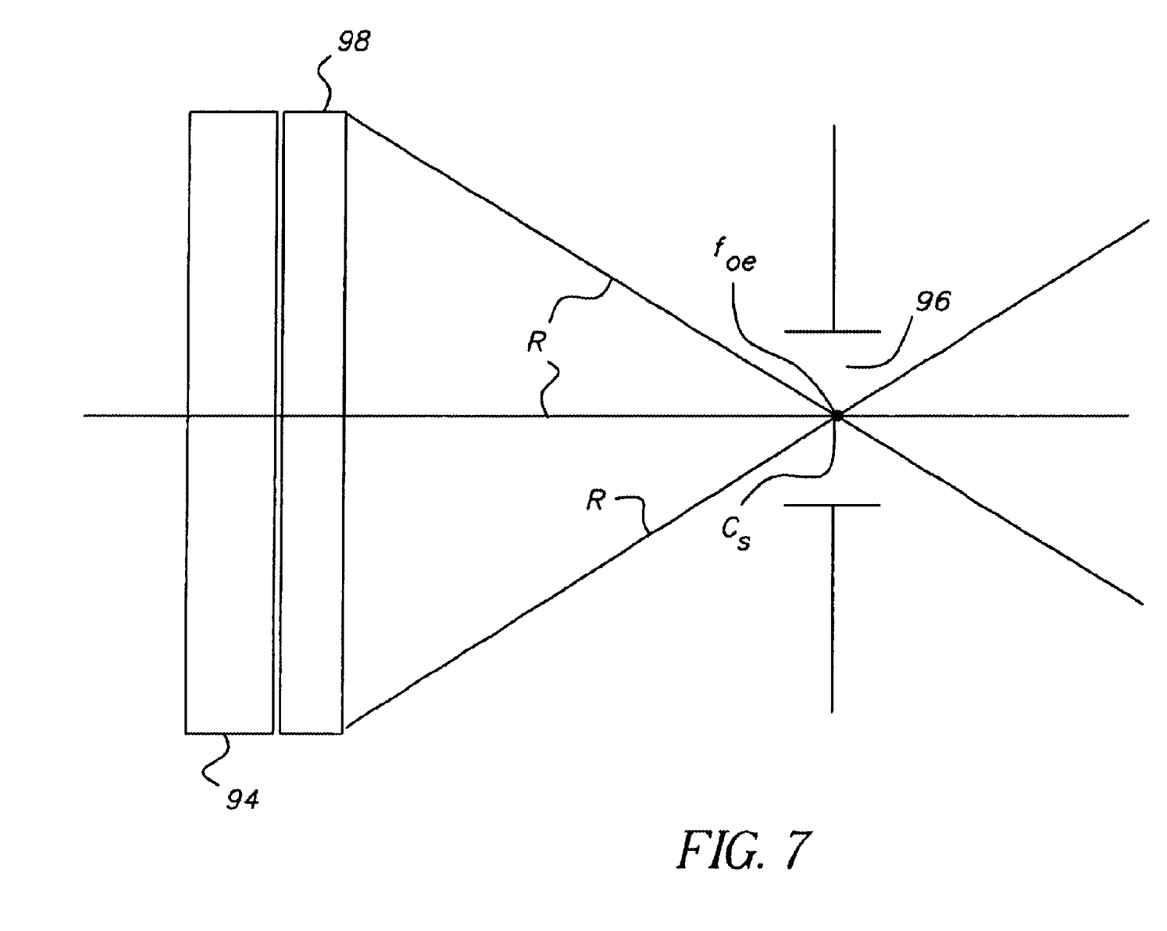
FIG. 7 is a schematic diagram showing the paths of central rays when a focusing optical element is used as a field lens on or near the surface of the spatial light modulator.

Still referring to FIG. 6, an optional focusing optical element 98 is employed for providing improved, uniform brightness across the field. Disposed against the surface of image source 94, or very near this surface, focusing optical element 98 acts as a type of field lens for directing light emitted from image source 94. Referring to FIG. 7, there is shown, in schematic form, the function of focusing optical element 98, focusing the emitted light from image source 94 to its focal point $f_{oe}$, coincident with mirror center of curvature $C_s$. By doing this, focusing optical element 98 forces telecentricity for light emitted from image source 94, thereby optimizing the brightness and contrast of the image provided to the optical system through aperture stop location 96. As a result, curved image 110 has optimum brightness a the field. In one embodiment, focusing optical element 98 is a Fresnel lens. Among other devices that could be employed as focusing optical element 98 are holographic optical elements, diffraction optical elements, two-cylinder Fresnel lenses, or even a more conventional curved surface lens, for example.

Considerations for Beamsplitter 102

As is shown in FIGS. 4 and 5, beamsplitter 102 must accept incident light over a range of angles, so that where beamsplitter 102 is made of glass, rays at extreme sides of the field effectively encounter different thicknesses of glass. For this reason, it can be seen that there are advantages to providing beamsplitter 102 having minimal thickness of glass or plastic. Thus, beamsplitter 102 is preferably a thin glass or thin plastic type or a pellicle type beamsplitting device.

Embodiment for Stereoscopic Viewing

Figure 8:
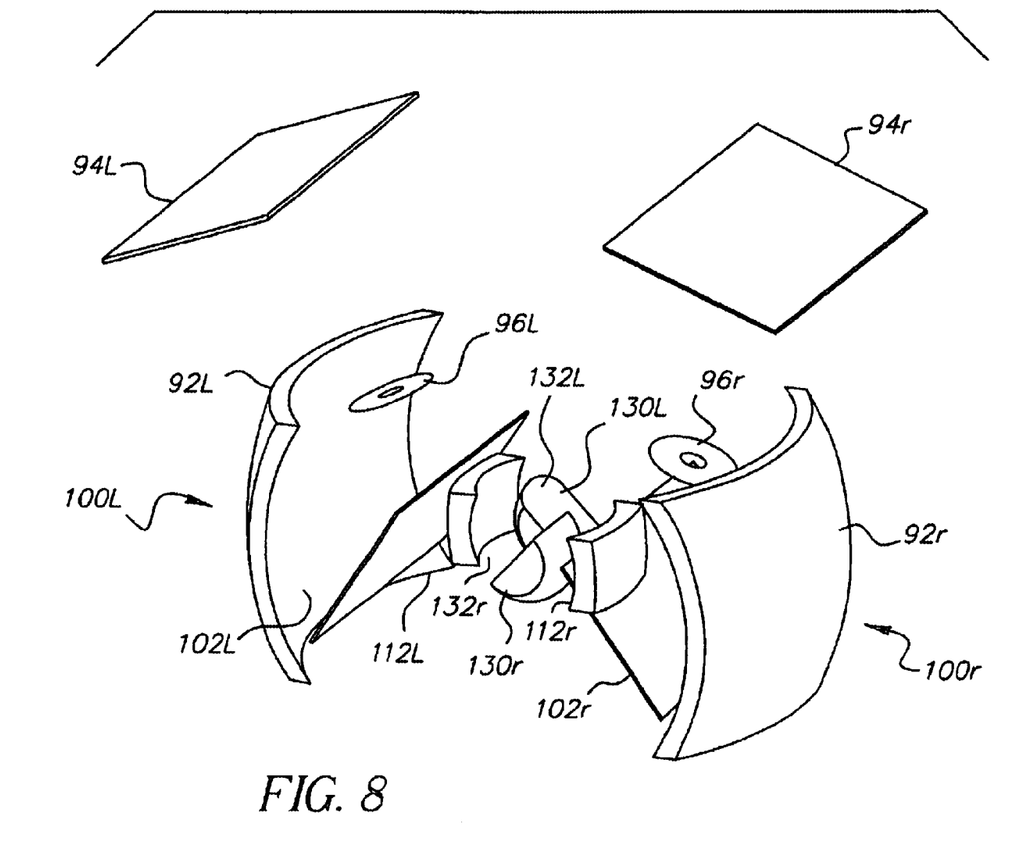
FIG. 8 is a perspective view showing a stereoscopic embodiment of the present invention.

Referring to FIG. 8, there is shown a perspective view of a left and a right eye image generation system 100*l* and 100*r*, where generating a curved image to be displayed to each eye uses the basic components of FIGS. 5 and 6. Left and right image sources 94*l* and 94*r* provide, through respective left and right aperture stop locations 96*l* and 96*r* and reflected from left and right beamsplitters 102*l* and 102*r*, images to their respective left and right spherical mirrors 92*l* and 92*r*. Respective left and right curved intermediate images, through respective left and right beamsplitters 102*l* and 102*r*, are formed near their respective left and right field lenses 112*l* and 112*r*, which redirect light to their respective left and right ball lens segments 130*l* and 130*r*. Left and right ball lens segments 130*l* and 130*r* are basically hemispheric, similar to hemispheric lens assembly 60 as shown in FIG. 3b. Left and right ball lens segments 130*l* and 130*r* are provided with left and right reflective surfaces 132*l* and 132*r* and perform the dual function of light path folding and image projection. With the arrangement of FIG. 8, each image generation system 100*l* and 100*r* can produce the appropriate image intended for the left and right eyes of a viewer.

The curved images generated by left and a right eye image generation systems 100*l* and 100*r* in FIG. 8 can be used as intermediate images for collimation in imaging systems that employ large spherical mirrors to provide virtual images, for example. These curved images can be re-imaged using a beamsplitter apparatus, as is disclosed in U.S. Pat. No. 6,416,181, for example. Referring back to FIGS. 1 and 6, curved image 110 of FIG. 6 could be used in place of intermediate curved image 80 in FIG. 1, for example.

The invention has been described in detail with particular reference to certain preferred embodiments thereof; but it will be understood that variations and modifications can be effected within the scope of the invention as described above, and as noted in the appended claims, by a person of ordinary skill in the art without departing from the scope of the invention. For example, field lens 112 can be more complex than is shown here, having different curvature, composition, or coatings. Image source 94, a transmissive LCD device in one embodiment, can be any of a number of types of image source, including film, CRT, LCD, and digital imaging devices. Image source 94 could be an missive array, such as an Organic Light Emitting Diode (OLED) array, for example. In order to take advantage of the benefits of monocentric imaging, spherical mirror 92 will be substantially spherical in most embodiments; however, some slight shape modifications might be used, with the corresponding changes to supporting optics.

Thus, what is provided is an apparatus and method for forming a curved image from a substantially flat image source using a monocentric optical system.

Parts List

14 Observer
16 Beamsplitter
22 Front focal surface
24 Curved mirror
30 Ball lens assembly
32 Diffusing element
40 Diffusive surface
42 Meniscus lens
44 Meniscus lens
46 Central spherical lens
48 Aperture stop
50 Curved image
54 Relay lens
60 Hemispheric lens assembly
62 Reflective surface
64 Curved image
66 Hemispheric central lens
70 Image generation system
74 Image generator
76 Intermediate image
80 Intermediate curved image
82 Stereoscopic projection system
90 Intermediate image
90' Intermediate image
92 Spherical mirror
92*l* Left spherical mirror
92*r* Right spherical mirror
94 Image source
94*l* Left image source
94*r* Right image source
96 Aperture Stop location
96*l* Left aperture stop location
96*r* Right aperture stop location
98 Focusing optical element
100 Image generation system
100*l* Left image generation system
100*r* Right image generation system
102 Beamsplitter
102*l* Left beamsplitter
102*r* Right beamsplitter
106 Ball lens pupil
110 Curved image
112 Field lens
112*l* Left field lens
112*r* Right field lens
130*l* Left ball lens segment
130*r* Right ball lens segment
132*l* Left reflective surface
132*r* Right reflective surface

What is claimed is:

1. An apparatus for forming a curved image comprising:
   (a) a spherical mirror having a mirror center of curvature;
   (b) a beamsplitter disposed between the vertex of said spherical mirror and said mirror center of curvature;
   (c) an image source for providing image-bearing light to said spherical mirror;
   said spherical mirror cooperating with said beamsplitter to form an intermediate image of said image source, said intermediate image having an image center of curvature; and
   (d) a ball lens segment, centered at said image center of curvature, for forming the curved image from said intermediate image.

2. An apparatus for forming a curved image according to claim 1 further comprising a field lens disposed near said intermediate image for imaging said mirror center of curvature toward said image center of curvature.

3. An apparatus for forming a curved image according to claim 2 wherein a surface of said field lens is substantially concentric with said mirror center of curvature.

4. An apparatus for forming a curved image according to claim 2 wherein a surface of said field lens is substantially concentric with said image center of curvature.

5. An apparatus for forming a curved image according to claim 1 wherein said ball lens segment comprises a hemispheric lens with a reflective surface.

6. An apparatus for forming a curved image according to claim 1 wherein said ball lens segment comprises at least one meniscus lens segment.

7. An apparatus for forming a curved image according to claim 1 wherein said image source is taken from the group consisting of a CRT, an emissive array, an LCD display.

8. An apparatus for forming a curved image according to claim 1 wherein said beamsplitter comprises a thin glass plate.

9. An apparatus for forming a curved image according to claim 1 wherein said beamsplitter comprises a thin plastic plate.

10. An apparatus for forming a curved image according to claim 1 wherein said beamsplitter comprises a pellicle.

11. An apparatus for forming a curved image according to claim 1 further comprising a focusing optical element adjacent to said image source for directing light toward said mirror center of curvature.

12. An apparatus for forming a curved image according to claim 11 wherein said focusing optical element is from the group consisting of a Fresnel lens, a holographic optical element, a diffraction optical element, and a lens.

13. An apparatus for forming a curved image comprising:
   (a) a spherical mirror having a mirror center of curvature;
   (b) a beamsplitter disposed between the vertex of said spherical mirror and said mirror center of curvature;
   (c) an image source for providing image-bearing light to said spherical mirror;
      said spherical mirror cooperating with said beamsplitter to form an intermediate image of said image source, said intermediate image having an image center of curvature;
   (d) a field lens disposed near said intermediate image for imaging said minor center of curvature toward said image center of curvature; and
   (e) a ball lens segment, centered at said image center of curvature, for forming the curved image from said intermediate image.

14. An apparatus for forming a curved image according to claim 13 wherein said ball lens segment comprises a hemispheric lens with a reflective surface.

15. An apparatus for forming a curved image according to claim 13 wherein said ball lens segment comprises at least one meniscus lens segment.

16. An apparatus for forming a curved image according to claim 13 wherein said image source is taken from the group consisting of a CRT, an emissive array, an LCD display.

17. An apparatus for forming a curved image according to claim 13 wherein a surface of said field lens is substantially concentric with said mirror center of curvature.

18. An apparatus for forming a curved image according to claim 13 wherein a surface of said field lens is substantially concentric with said image center of curvature.

19. An apparatus for forming a curved image according to claim 13 wherein said beamsplitter comprises a thin glass plate.

20. An apparatus for forming a curved image according to claim 13 wherein said beamsplitter comprises a thin plastic plate.

21. An apparatus for forming a curved image according to claim 13 wherein said beamsplitter comprises a pellicle.

22. An apparatus for forming a curved image according to claim 13 further comprising a focusing optical element adjacent to said image source for directing light toward said mirror center of curvature.

23. An apparatus for forming a curved image according to claim 22 wherein said focusing optical element is from the group consisting of a Fresnel lens, a holographic optical element, a diffraction optical element, and a lens.

24. An apparatus for forming a pair of curved images, comprising a left image generation system for forming a left curved image and a right image generation system for forming a right curved image, each image generation system comprising:
   (a) a spherical mirror having a mirror center of curvature;
   (b) a beamsplitter disposed between the vertex of said spherical mirror and said mirror center of curvature;
   (c) an image source for providing image-bearing light to said spherical mirror;
      said spherical mirror cooperating with said beamsplitter to form an intermediate image of said image source, said intermediate image having an image center of curvature; and
   (d) a ball lens segment, centered at said image center of curvature, for forming the curved image from said intermediate image.

25. An apparatus for forming a curved image according to claim 24 wherein each image generation system further comprises a field lens disposed near said intermediate image for imaging said mirror center of curvature toward said image center of curvature.

26. An apparatus for forming a curved image according to claim 25 wherein a surface of said field lens is substantially concentric with said mirror center of curvature.

27. An apparatus for forming a curved image according to claim 25 wherein a surface of said field lens is substantially concentric with said image center of curvature.

28. An apparatus for forming a curved image according to claim 24 wherein said ball lens segment comprises a hemispheric lens with a reflective surface.

29. An apparatus for forming a curved image according to claim 24 wherein said ball lens segment comprises at least one meniscus lens segment.

30. An apparatus for forming a curved image according to claim 24 wherein said image source is taken from the group consisting of a CRT, an emissive array, an LCD display.

31. An apparatus for forming a curved image according to claim 24 wherein said beamsplitter comprises a thin glass plate.

32. An apparatus for forming a curved image according to claim 24 wherein said beamsplitter comprises a thin plastic plate.

33. An apparatus for forming a curved image according to claim 24 wherein said beamsplitter comprises a pellicle.

34. An apparatus for forming a curved image according to claim 24 further comprising a focusing optical element adjacent to said image source for directing light toward said mirror center of curvature.

35. An apparatus for forming a curved image according to claim 34 wherein said focusing optical clement is from the group consisting of a Fresnel lens, a holographic optical element, a diffraction optical element, and a lens.

36. An apparatus for forming a pair of curved images, comprising a left image generation system for forming a left curved image and a right image generation system for forming a right curved image, each image generation system comprising:
   (a) a spherical mirror having a mirror center of curvature;
   (b) a beamsplitter disposed between the vertex of said spherical mirror and said mirror center of curvature;
   (c) an image source for providing image-bearing light to said spherical mirror;
      said spherical mirror cooperating with said beamsplitter to form an intermediate image of said image source, said intermediate image having an image center of curvature;

(d) a field lens disposed near said intermediate image for imaging said mirror center of curvature toward said image center of curvature; and (e) a ball lens segment, centered at said image center of curvature, for forming the curved image from said intermediate image.

37. An apparatus for forming a curved image according to claim 36 wherein said ball lens segment comprises a hemispheric lens with a reflective surface.

38. An apparatus for forming a curved image according to claim 36 wherein said ball lens segment comprises at least one meniscus lens segment.

39. An apparatus for forming a curved image according to claim 36 wherein said image source is taken from the group consisting of a CRT, an emissive array, an LCD display.

40. An apparatus for forming a curved image according to claim 36 wherein a surface of said field lens is substantially concentric with said mirror center of curvature.

41. An apparatus for forming a curved image according to claim 36 wherein a surface of said field lens is substantially concentric with said image center of curvature.

42. An apparatus for forming a curved image according to claim 36 wherein said beamsplitter comprises a thin glass plate.

43. An apparatus for forming a curved image according to claim 36 wherein said beamsplitter comprises a thin plastic plate.

44. An apparatus for forming a curved image according to claim 36 wherein said beamsplitter comprises a pellicle.

45. An apparatus for forming a curved image according to claim 36 further comprising a focusing optical element adjacent to said image source for directing light toward said mirror center of curvature.

46. An apparatus for forming a curved image according to claim 45 wherein said focusing optical element is from the group consisting of a Fresnel lens, a holographic optical element, a diffraction optical element, and a lens.

47. A method for forming a curved image comprising:

(a) directing an image-bearing light toward a spherical mirror;

(b) forming a curved intermediate image having an intermediate image center of curvature by positioning a beamsplitter between the vertex of said spherical mirror and the center of curvature of said spherical mirror; and (c) positioning a ball lens segment centered near said intermediate image center of curvature for forming the curved image.

48. A method for forming a curved image according to claim 47 further comprising:

(a) positioning a field lens disposed near said intermediate image for imaging the center of curvature of said spherical mirror toward said intermediate image center of curvature, thereby imaging the center of curvature of said spherical mirror toward the center of curvature of said ball lens segment.

49. A method for forming a curved image according to claim 47 wherein the step of directing an image-bearing light toward a spherical mirror comprises the step of forming an image on a CRT display.

50. A method for forming a curved image according to claim 47 wherein the step of directing an image-bearing light toward a spherical mirror comprises the step of forming an image on an emissive display.

51. A method for forming a curved image according to claim 47 wherein the step of directing an image-bearing light toward a spherical mirror comprises the step of forming an image on an LCD display.

52. A method for forming a curved image according to claim 47 wherein the step of positioning a beamsplitter comprises the step of positioning a pellicle between the vertex of said spherical mirror and the center of curvature of said spherical mirror.

53. A method for forming a curved image according to claim 47 wherein the step of directing an image-bearing light comprises the step of positioning a focusing optical element adjacent to the surface of an image source for providing said image-bearing light as a substantially telecentric beam.

* * * * *